US011853710B2

(12) United States Patent
Ravindranath et al.

(10) Patent No.: US 11,853,710 B2
(45) Date of Patent: Dec. 26, 2023

(54) METHOD AND SYSTEM FOR EXTRACTING NATURAL LANGUAGE ELEMENTS EMBEDDED IN APPLICATION SOURCE CODE

(71) Applicant: Tata Consultancy Services Limited, Mumbai (IN)

(72) Inventors: Yogananda Ravindranath, Chennai (IN); Tamildurai Mehalingam, Chennai (IN); Aditya Thuruvas Senthil, Chennai (IN); Reshinth Gnana Adithyan, Chennai (IN); Shrayan Banerjee, Chennai (IN); Balakrishnan Venkatanarayanan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 264 days.

(21) Appl. No.: 17/182,766

(22) Filed: Feb. 23, 2021

(65) Prior Publication Data
US 2022/0137933 A1    May 5, 2022

(30) Foreign Application Priority Data
Nov. 2, 2020   (IN) .............................. 202021047831

(51) Int. Cl.
*G06F 40/58*      (2020.01)
*G06F 40/284*    (2020.01)
(Continued)

(52) U.S. Cl.
CPC ............ *G06F 40/58* (2020.01); *G06F 40/284* (2020.01); *G06F 40/30* (2020.01); *G06N 3/08* (2013.01)

(58) Field of Classification Search
CPC ........ G06F 8/311; G06F 40/284; G06F 40/30; G06F 40/58; G06F 40/205; G06F 40/279; G06F 8/75; G06N 3/08; G06N 3/0454
See application file for complete search history.

(56) References Cited

U.S. PATENT DOCUMENTS

| | | | |
|---|---|---|---|
| 10,713,589 B1 * | 7/2020 | Zarandioon | G06N 20/20 |
| 2019/0278569 A1 * | 9/2019 | Horton | G06F 8/34 |

(Continued)

OTHER PUBLICATIONS

Fluri, Beat, et al. "Do code and comments co-evolve? on the relation between source code and comment changes." 14th Working Conference on Reverse Engineering (WCRE 2007). IEEE, 2007, pp. 1-10 (Year: 2007).*

(Continued)

*Primary Examiner* — Jesse S Pullias
*Assistant Examiner* — Michael C. Lee
(74) *Attorney, Agent, or Firm* — FINNEGAN, HENDERSON, FARABOW, GARRETT & DUNNER LLP

(57) ABSTRACT

Natural language elements are present in both the executable lines and non-executable lines of the code. Rich information hidden within them are often ignored in code analysis as extraction of meaningful insights from its raw form is not straight forward. A system and method extracting natural language elements from an application source code is provided. The disclosure provides a method for performing detailed analytics on the natural language elements, classify those using deep learning networks and create meaningful insights. The system understands the different type of natural language elements, comment patterns present in the application source code and segregates the authentic comments having valuable insights, version comments, data element level comments from other non-value adding comments. The embedded intelligence finally takes care of mapping the (Continued)

extracted natural language elements with the code blocks, thus making it consumable and opening a range of applications in domain contextualization, code documentation and maintenance.

11 Claims, 12 Drawing Sheets

(51) Int. Cl.
  *G06F 40/30* (2020.01)
  *G06N 3/08* (2023.01)

(56) References Cited

U.S. PATENT DOCUMENTS

| | | | | |
|---|---|---|---|---|
| 2019/0325029 | A1* | 10/2019 | Gandhi | G06F 40/284 |
| 2020/0250304 | A1* | 8/2020 | Kruus | G06N 20/00 |
| 2020/0410054 | A1* | 12/2020 | Kumar | G06F 40/30 |
| 2021/0026920 | A1* | 1/2021 | Kar | G06F 40/205 |
| 2021/0034707 | A1* | 2/2021 | Podgorny | G06F 16/3349 |
| 2021/0064364 | A1* | 3/2021 | Culibrk | G06F 8/71 |
| 2021/0109958 | A1* | 4/2021 | Behtash | G06F 18/214 |
| 2021/0318865 | A1* | 10/2021 | Farivar | G06F 8/77 |

OTHER PUBLICATIONS

Steidl, Daniela, et al. "Quality analysis of source code comments." 2013 21st international conference on program comprehension (icpc). IEEE, 2013, pp. 83-92 (Year: 2013).*

Pawelka, Timo, et al. "Is this code written in English? A study of the natural language of comments and identifiers in practice." 2015 IEEE International Conference on Software Maintenance and Evolution (ICSME). IEEE, 2015, pp. 401-410 (Year: 2015).*

Pascarella, Luca. "Classifying code comments in Java open-source software systems." 2017 IEEE/ACM 14th International Conference on Mining Software Repositories (MSR). 2017. pp. 227-237 (Year: 2017).*

Bai, Yang, et al. "Automatic Generation of Code Comments Based on Comment Reuse and Program Parsing." 2019 2nd International Conference on Safety Produce Informatization (IICSPI). IEEE, 2019, pp. 380-388 (Year: 2019).*

"Google Java Style Guide", available at https://web.archive.org/web/20201017215130/https://google.github.io/styleguide/javaguide.html (archived on Oct. 17, 2020) (Year: 2020).*

Definition of "extract" in Merriam Webster dictionary, https://web.archive.org/web/20200811104013/https://www.merriam-webster.com/dictionary/extract (archived on Aug. 11, 2020) (Year: 2020).*

Definition of "split" in Merriam Webster dictionary, available at https://web.archive.org/web/20201101191535/https://www.merriam-webster.com/dictionary/split (archived on Nov. 1, 2020) (Year: 2020).*

Gilda, Shlok. "Source code classification using Neural Networks." 2017 14th international joint conference on computer science and software engineering (JCSSE). IEEE, 2017, pp. 1-6 (Year: 2017).*

LeClair, Alexander, et al. "Adapting neural text classification for improved software categorization." 2018 IEEE international conference on software maintenance and evolution (ICSME). IEEE, 2018, pp. 461-462 (Year: 2018).*

Ciurumelea, Adelina, et al. "Suggesting comment completions for python using neural language models." 2020 IEEE 27th international conference on software analysis, evolution and reengineering (SANER). IEEE, (Apr. 2, 2020), pp. 456-467 (Year: 2020).*

Panthaplackel, Sheena et al., "Associating Natural Language Comment and Source Code Entities", Computation and Language, Dec. 2019, Arxiv, https://arxiv.org/ftp/arxiv/papers/1912/1912.06728.pdf.

Chen, Huanchao et al., "Automatically detecting the scopes of source code comments", Annual Computer Software and Applications Conference (COMPSAC), Jul. 2018, IEEE, https://reader.elsevier.com/reader/sd/pii/S016412121930055X?token=D3054AF8925A28F7858E830F1AA96F1FCBFC300E590E9D2520DEED052A1407FFA55FD7F0586D58EA9E804A875E13C830.

Rahman, Mohammad Masudur et al., "Recommending Insightful Comments for Source Code using Crowdsourced Knowledge", Computer Science, Sep. 2015, Semantic Scholar, https://www.researchgate.net/publication/281032800_Recommending_Insightful_Comments_for_Source_Code_using_Crowdsourced_Knowledge/link/5602b74e08ae3b544e352a1e/download.

Pascarella, Luca et al., "Classifying code comments in Java software systems", Empirical Software Engineering, Apr. 2019, Springer, https://link.springer.com/article/10.1007/s10664-019-09694-w.

Liang, Yuding et al., "Automatic Generation of Text Descriptive Comments for Code Blocks", Artificial Intelligence, Aug. 2018, Arxiv, https://arxiv.org/pdf/1808.06880.pdf.

Ramos, Pedro et al., Automatic Annotation of Tasks in Structured Code, Conference, Nov. 2018, Research Gate, https://homepages.dcc.ufmg.br/~fernando/publications/papers/PACT18.pdf.

* cited by examiner

METHOD AND SYSTEM FOR EXTRACTING NATURAL LANGUAGE ELEMENTS EMBEDDED IN APPLICATION SOURCE CODE

PRIORITY CLAIM

This U.S. patent application claims priority under 35 U.S.C. § 119 to: India Application No. 202021047831, filed on Nov. 2, 2020. The entire contents of the aforementioned application are incorporated herein by reference.

TECHNICAL FIELD

The disclosure herein generally relates to field of source code analysis, and, more particularly, to a method and system for extracting natural language elements embedded in application source code used in an information technology (IT) application.

BACKGROUND

The maturity of an enterprise is directly proportional to its adaptability to business, technology and regulatory demands. Due to these business, technology and regulatory demands, the IT systems of those enterprise evolve through the years. This leads to enormous changes in the codes involved in the IT systems over the period of time. Maintenance of these age-old IT systems is a mammoth task. All the available automation in the field of code analysis and reverse engineering is mostly focused on the code syntax and its variables etc. These existing analysis misses out on the analysis of the natural language elements, which will also increase along with code evolution and help in understanding of the code. The natural language elements are present in both the executable lines and the non-executable lines of the code.

Executable lines would contain natural language elements in the form of hard-coded values embedded in the code and the non-executable lines would have the natural language elements in the form of comments and any additional forms of documentation with in the code. This documentation, comments and the natural language elements within the executable code can contain information of multiple aspects of code evolution like the brief functionality of the code, domain values, code history, version changes, information on the enhancements and the author who did the change and so on. The extraction of these information hidden in the natural language elements of the code is often ignored.

SUMMARY

Embodiments of the present disclosure present technological improvements as solutions to one or more of the above-mentioned technical problems recognized by the inventors in conventional systems. For example, in one embodiment, a system for extracting natural language elements from an application source code is provided. The system comprises a user interface, one or more hardware processors and a memory. The user interface provides the application source code as an input for extracting natural language elements, wherein the application source code comprises executable lines and non-executable lines. The memory is in communication with the one or more hardware processors, wherein the one or more first hardware processors are configured to execute programmed instructions stored in the one or more first memories, to: extract commented lines and non-commented lines from the application source code, wherein the commented lines, hard-coded domain values and the non-executable sections derived from the non-executable lines constitute the natural language elements in the application source code; split the extracted commented lines into code variable declarations (CVDs) and statements with code logic (CLS) based on the usage of the commented lines; block the CVD and CLS as blocks, if they are split into more than one lines, based on the start/end keywords/patterns of the CVD and CLS; encode CVD token sequences and CLS token sequences out of the blocks of CVD and CLS using an input data preparation model; pass the encoded CVD token sequences and CLS token sequences to their respective authentic comment classification model to classify a set of authentic comments from the plurality of code comments, wherein the authentic comment classification model for CVD and CLS is pre-generated using a corpus training data; extract version and non-version comments out of the set of authentic comments using a version comment classifier model, wherein the version comment classifier model is pre-generated using a corpus training data, wherein the version comments and the non-version comments are extracted as a plurality of comment blocks; and map the plurality of comment blocks corresponding to a plurality of executable code blocks present in the application source code, using a set of embedded intelligence techniques.

In another aspect, a method for extracting natural language elements from an application source code is provided. Initially, the application source code is provided as an input for extracting natural language elements, wherein the application source code comprises executable lines and non-executable lines. In the next step, commented lines and non-commented lines are extracted from the application source code, wherein the commented lines, hard-coded domain values and the non-executable sections derived from the non-executable lines constitute the natural language elements in the application source code. Further, the extracted commented lines are split into code variable declarations (CVDs) and statements with code logic (CLS) based on the usage of the commented lines. In the next step, the CVDs and CLS are grouped as blocks, if they are split into more than one lines, based on the start-end keywords or patterns of the CVD and CLS. In the next step, CVD token sequences and CLS token sequences are encoded out of the blocks of CVD and CLS using an input data preparation model. The encoded CVD token sequences and CLS token sequences are then passed to their respective authentic comment classification model to classify a set of authentic comments from the code comments, wherein the authentic comment classification model for CVD and CLS is pre-generated using a corpus training data. In the next step, version and non-version comments are extracted out of the set of authentic comments using a version comment classifier model, wherein the version comment classifier model is pre-generated using the corpus training data, wherein the version comments and the non-version comments are extracted as a plurality of comment blocks. And finally, the plurality of comment blocks are mapped corresponding to a plurality of executable code blocks present in the application source code, using a set of embedded intelligence techniques.

In yet another aspect, there are provided one or more non-transitory machine-readable information storage mediums comprising one or more instructions which when executed by one or more hardware processors cause extraction of natural language elements from an application source code. Initially, the application source code is provided as an input for extracting natural language elements, wherein the application source code comprises executable lines and non-executable lines. In the next step, commented lines and non-commented lines are extracted from the application source code, wherein the commented lines, hard-coded domain values and the non-executable sections derived from the non-executable lines constitute the natural language elements in the application source code. Further, the extracted commented lines are split into code variable declarations (CVDs) and statements with code logic (CLS) based on the usage of the commented lines. In the next step, the CVDs and CLS are grouped as blocks, if they are split into more than one lines, based on the start-end keywords or patterns of the CVD and CLS. In the next step, CVD token sequences and CLS token sequences are encoded out of the blocks of CVD and CLS using an input data preparation model. The encoded CVD token sequences and CLS token sequences are then passed to their respective authentic comment classification model to classify a set of authentic comments from the code comments, wherein the authentic comment classification model for CVD and CLS is pre-generated using a corpus training data. In the next step, version and non-version comments are extracted out of the set of authentic comments using a version comment classifier model, wherein the version comment classifier model is pre-generated using corpus training data, wherein the version comments and the non-version comments are extracted as a plurality of comment blocks. And finally, the plurality of comment blocks are mapped corresponding to a plurality of executable code blocks present in the application source code, using a set of embedded intelligence techniques.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
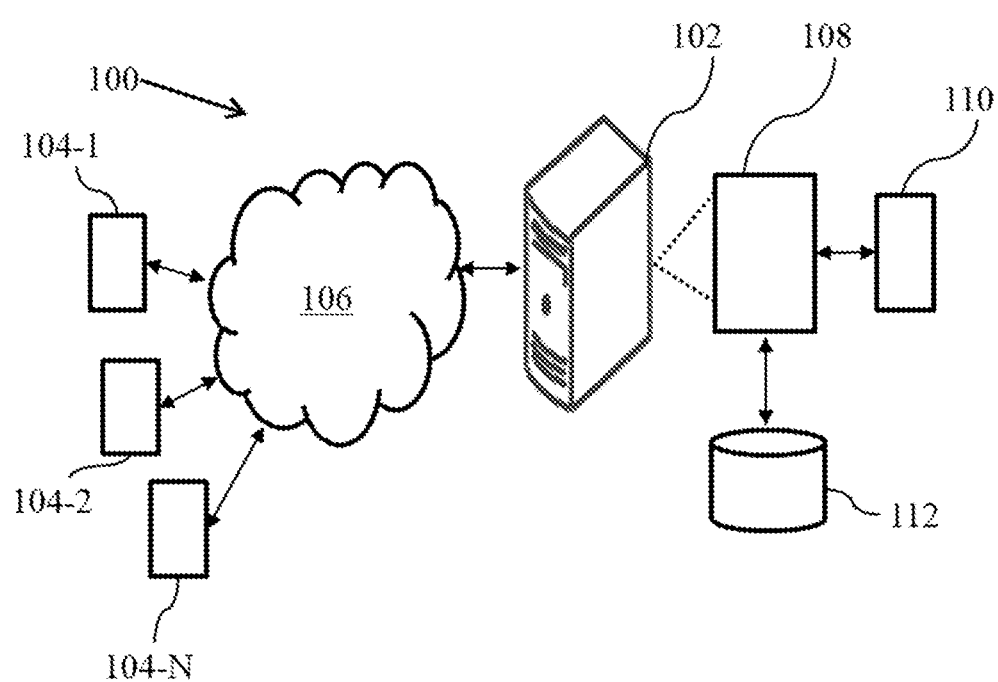
FIG. 1 illustrates a network diagram of a system for extracting natural language elements from an application source code according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

In IT applications, legacy codes have evolved over the years and are maintained by multiple developers. During this evolution, the documentation with in the non-executable lines of the code, the code comments and the newer/updated hard-coded values in the code also evolve. Though these natural language elements tend to have the first-hand information of the actual code logic/enhancement made, trying to extract meaningful insights from them is not straight forward. Syntactical elements in the code have a defined language-based structures but the Natural Language Elements, especially the comments are the most complex elements to comprehend and do not have any specific structure or limits. Each developer will have unique way of writing comments. A comment can be written anywhere in the code and not necessarily adjacent to the code blocks. An earlier version of the source code which is commented is also a comment, but it does not serve any meaningful insight. A framework which can extract all the different type of comments and extract meaningful information out of it does not exist. Ability to differentiate the actual comments from commented source code is needed to get any useful information out of them. In addition, there is also a need to differentiate the version based comments from non-version based comments, logically group the comments and map the comment blocks with the code blocks. Moreover, codes may also have non-English comments, in those cases language translation along with code analysis is needed.

According to an embodiment of the disclosure, a system and method for extracting natural language elements and derive meaningful insights from an application source code is provided. The disclosure provides a method for performing detailed analytics on the natural language elements, classify those using deep learning networks and creates meaningful insights Further, the system is using the deep learning networks to understand the different type of comment patterns present in the application source code and segregates the authentic comments from the source code which is a commented during a code fix/enhancement. The system further logically groups the discrete commented lines of code into comment blocks. Also, the embedded intelligence takes care of mapping the comment block to the source block. This disclosure applies to various applications like predicting the domain of the application source code and helps in grouping the components that belong to same functionality, code understanding and documentation, code maintenance, incorporating value adding comments in the target code during a code translation and reverse engineering by the analysis done on all these natural language elements.

Referring now to the drawings, and more particularly to FIG. 1 through FIG. 12, where similar reference characters denote corresponding features consistently throughout the figures, there are shown preferred embodiments and these embodiments are described in the context of the following exemplary system and/or method.

FIG. 1 illustrates a network diagram of a system 100 for extracting natural language elements from an application source code. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail. According to an embodiment of the disclosure, the memory 110 further comprises a plurality of modules. The plurality of modules are configured to perform various functions.

According to an embodiment of the disclosure, the system 100 includes two models, an authentic comment classification model and a version comment classification model. The authentic comment classification model is configured to classify the authentic comment out of the code comments. While, the version comment classification model is configured to classify the comments into version or non-version comment. The authentic comment classification model and the version comment classification models are generated using a training corpus data.

Figure 3:
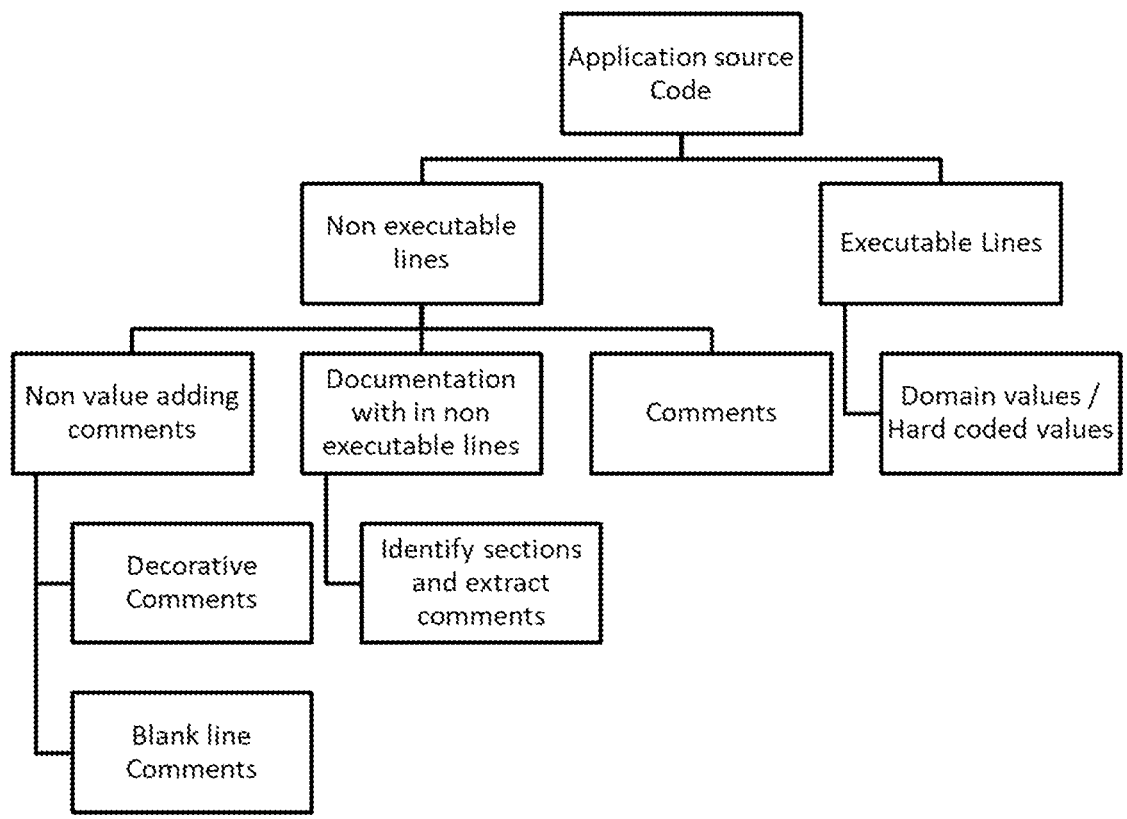
FIG. 3 illustrates a block diagram showing the different natural language elements and grouping according to some embodiments of the present disclosure.

According to an embodiment of the disclosure, the training corpus data and the application source code may comprise various natural language elements as shown in the block diagram of FIG. 3. The application source code or the training corpus data comprises of executable lines and non-executable lines. The executable lines further comprise domain values/hard-coded domain values. The non-executable lines comprise many non-value adding comments, documentation within non-executable lines and commented lines. The non-value adding comments may further comprise decorative comments and blank line comments and the like, which are not natural language elements. Out of the documentation within non-executable lines and commented lines, further sections are identified and comments are extracted. Thus, the commented lines, hard-coded domain values and the sections identified from the non-executable lines are referred as the natural language elements.

The application source code is analyzed by an inbuilt parser which identifies all the different natural language patterns and extracts these lines in the code. The extracted natural language elements are documented in a structured user-consumable format. These natural language elements fall into various categories Domain values/hard-coded values within the code: The domain values or the hard-coded values with in the code can be present in multiple sections with in the code and provide a great information on the context of the code. The multiple information that is extracted from the hard-coded values is present with in the code.

Program documentation with in non-executable sections: This is a very important source of information about the application source code. It refers to multiple sections with in the code which are neither comment nor executable but in turn has rich information about the code. For instance, REMARKS section in Mainframe COBOL, Debug statements in multiple languages which are neither comment/executable and the like. It also gets updated during the evolution of the code.

Commented lines of Code: These commented lines can either be single line independent comments or block comments provided in individual lines. Certain languages also allow to provide a comment with a start pattern and end pattern to determine comment blocks.

Figure 4:
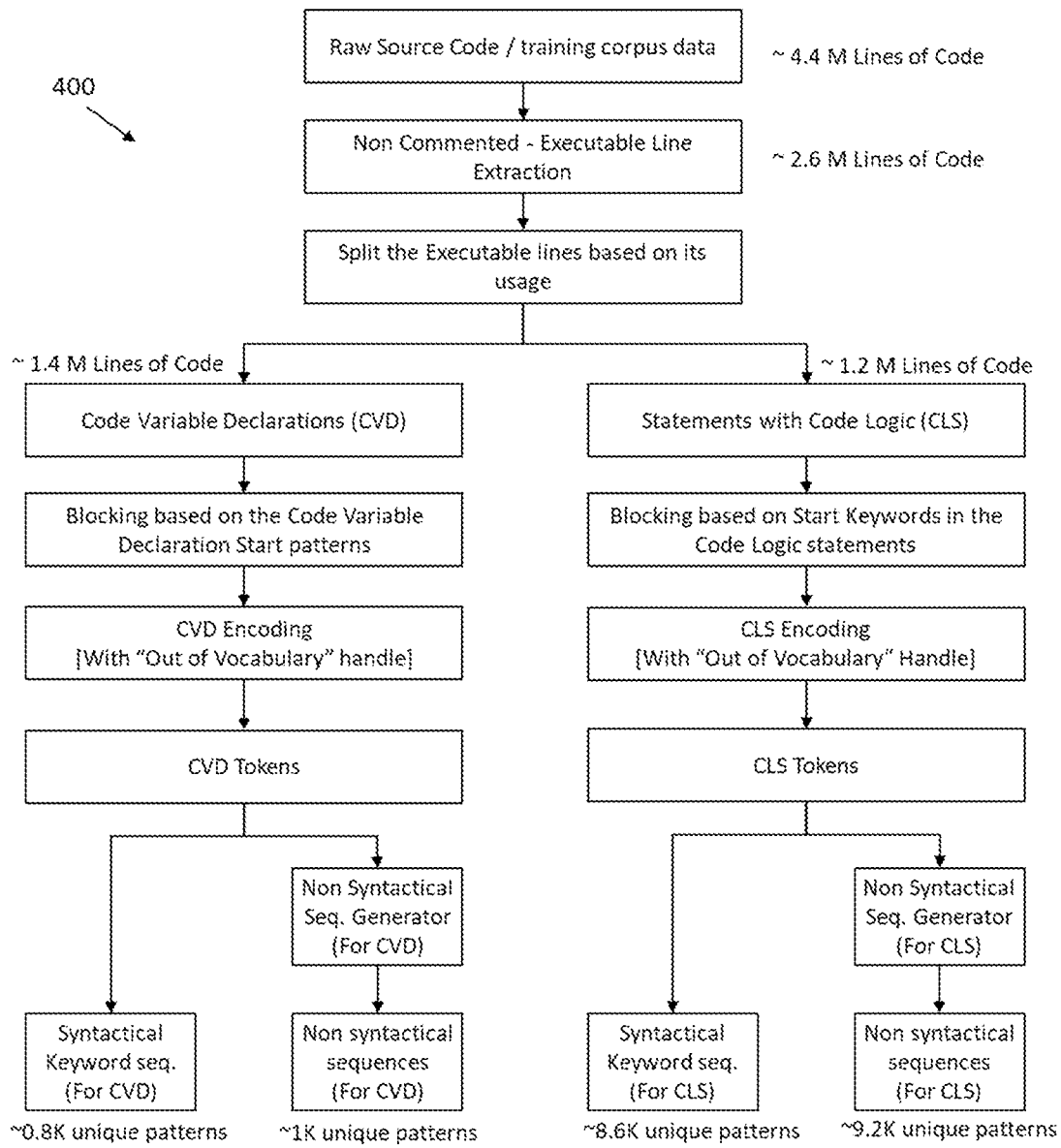
FIG. 4 illustrates a flowchart showing a method for preparing training data for training an authentic comment classification model according to some embodiment of the present disclosure.

According to an embodiment of the disclosure, a flowchart 400 of a method for preparing training data for training the authentic comment classification model is shown in FIG. 4. In addition to that the flowchart 400 also shows approximate number of lines of codes at various steps according to an example of the present disclosure. To train the authentic comment classification model, the raw source code or the corpus training data need to be preprocessed to capture the features of both the commented source code and its compliment. As shown in the figure, the raw source code or a corpus training data is provided as input. Further, non-commented executable lines are extracted from the input. The non-commented executable lines are then split into code variable declarations and statement with code logics based on the usage.

From the training corpus data, the executable lines of code are extracted. The executable lines of code contain a combination of multiple syntactical patterns which includes code variable declarations (CVD) and its initiations and another set of syntactical patterns which is a combination of code logic statements (CLS). Neural network classifiers do not tend to generalize well on varied styles or variety of tasks at once. (E.g. A classifier that can classify poems to its authors, cannot adapt well to classify short stories to authors due the variation in style of inputs synonymous to our two varied sections of program discussed above). Even if it does, it tends to be a model with large number of trainable parameters and becomes resource heavy. Hence the flowchart 400 includes an algorithm that differentiates and splits the different styles of code and builds separate data for two different models each for the Code Variable Declarations (CVD) and the Code Logic Statements (CLS). The splitting results in increase in efficiency, memory wise and computation wise.

Further as shown in FIG. 4 for CVD data, blocking or grouping is done based on the code variable declaration start patterns. Based on the coding conventions and the formatting followed by different developers, code lines which tend to be long are continued in next line. Handling these multiline scenarios as unique patterns drastically increases the unique number of statements that can exist for a programming language. For instance: Below are the various forms in which a declaration line can be present in the source code:

Complete statement in the same line
01 VAR-1 PIC X(10) VALUE 'VALUE OF VAR-1'.
Statement split into multiple lines in various levels
01 VAR-1
PIC X(10) VALUE 'VALUE OF VAR-1'.
01 VAR-1 PIC X(10) VALUE
'VALUE OF VAR-1'.
01 VAR-1 PIC X(10) VALUE 'VALUE OF
VAR-1'.

Identifying these as unique patterns exponentially increases the complexity of the problem and makes it difficult for a model to handle. Hence, such multi lines handled based on the Start/End patterns of code variable declarations for the CVD model. This approach is adaptable to any given programming language with the knowledge Start/End keyword patterns which is available for any language. The CVD model is enabled to understand that all the 4 different forms represent the same syntactical pattern of the same statement. Similarly, for CLS data, grouping is done based on start keywords in the code logic statements.

Further as shown in FIG. 4 for CVD data, CVD Encoding is performed with an "Out of Vocabulary" Handle. As in any problem involving source code analysis, the possibility of a variable name is infinite. This makes the problem of "Out of Vocabulary" token inevitable. To handle such scenarios and still not give up on the efficiency of classification of a "code statement", a level of abstraction to the code statements is added. Apart from the keywords in a language, literals and other hard-coded values and all the other words which would include variable names, are abstracted into a unique token thus handling OOV problem. In parallel, CLS encoding with "out of vocabulary" handle is done. This step results in the generation of the encoded form of the CVD/CLS tokens. The extracted CVD tokens and the CLS tokens represent the syntactical keyword sequences and the non-syntactical sequences for both CVD and CLS respectively are generated via a non-sequence generator.

Syntactical Keyword Sequences and Non-Syntactical Sequence Generator: The executable lines that are encoded as CVD/CLS blocks represents the syntactical keyword sequences. But to train the model to classify commented source code patterns and authentic comments, data need to represent the both the classes in a holistic way. While the data to represent the commented "source code" patterns are available from the derived syntactical keyword sequences, the possibilities of the non-syntactical patterns are infinite. It also needs to represent the non-syntactical patterns that look very close to authentic code patterns yet be able to differentiate it. For instance, IF IT'S NOT TRUE—Authentic comment
IF NOT TRUE—Commented source code pattern
is a statement that is just one word away from being classified into an authentic code Non-syntactical sequence generator: A generator built with algorithms to include the syntactical flavor embedded with non-syntactical tokens was designed to generate the non-syntactical sequence patterns. In many cases, the natural language might also be very similar to a code statement. Like in the above example of the "IF NOT TRUE" statement, many keywords in the code of a particular language statement like IF, MOVE, STRING, PERFORM, EVALUATE, IS, OF, AS etc. also have specific natural language meaning. Taking the example of a valid syntactical pattern,—"MOVE <one-item> TO <other-item>" can be considered as a valid Natural Language statement too. Trying to identify all these different kinds of patterns from a natural language corpus and mark them as syntactical patterns is also tedious and impossible if the same has to be repeated for every programming language. Thus, evolved the non-syntactical sequence generator with a combination of multiple algorithms to address the above scenarios. Few examples of the multiple algorithms employed to generate Non syntactical Keyword patterns include but are not restricted to, 1. Get the valid syntactical patterns as input, retain the keyword positions and insert more than the expected non keywords in between the keywords to generate the non-syntactical patterns, 2. Get the Maximum Sequence Length and generate multiple random sequence length which is less than or equal to the maximum sequence length and randomly shuffle the keywords and the non-keywords, 3. Get valid syntactical patterns as input, retain only the start keyword in the start and replace the other keywords to obtain non-syntactical patterns, 4. Do a random shuffle of the keywords and non-keywords to obtain non-syntactical patterns, 5. Remove all keywords from the syntactical patterns, 6. Remove all non-keywords from syntactical patterns and the like. These algorithms ensure to create non-syntactical patterns that train the model in a way that, it can learn any non-syntactical pattern that is even very close to the syntactical patterns and be able to predict it. Along with these patterns, a natural language corpus was also injected into the dataset. Due to the advent of such an automated generator, there was no need of a human supervised accumulation of patterns and training making it fully automated and adaptable to any programming language with almost zero human interference.

Figure 5:
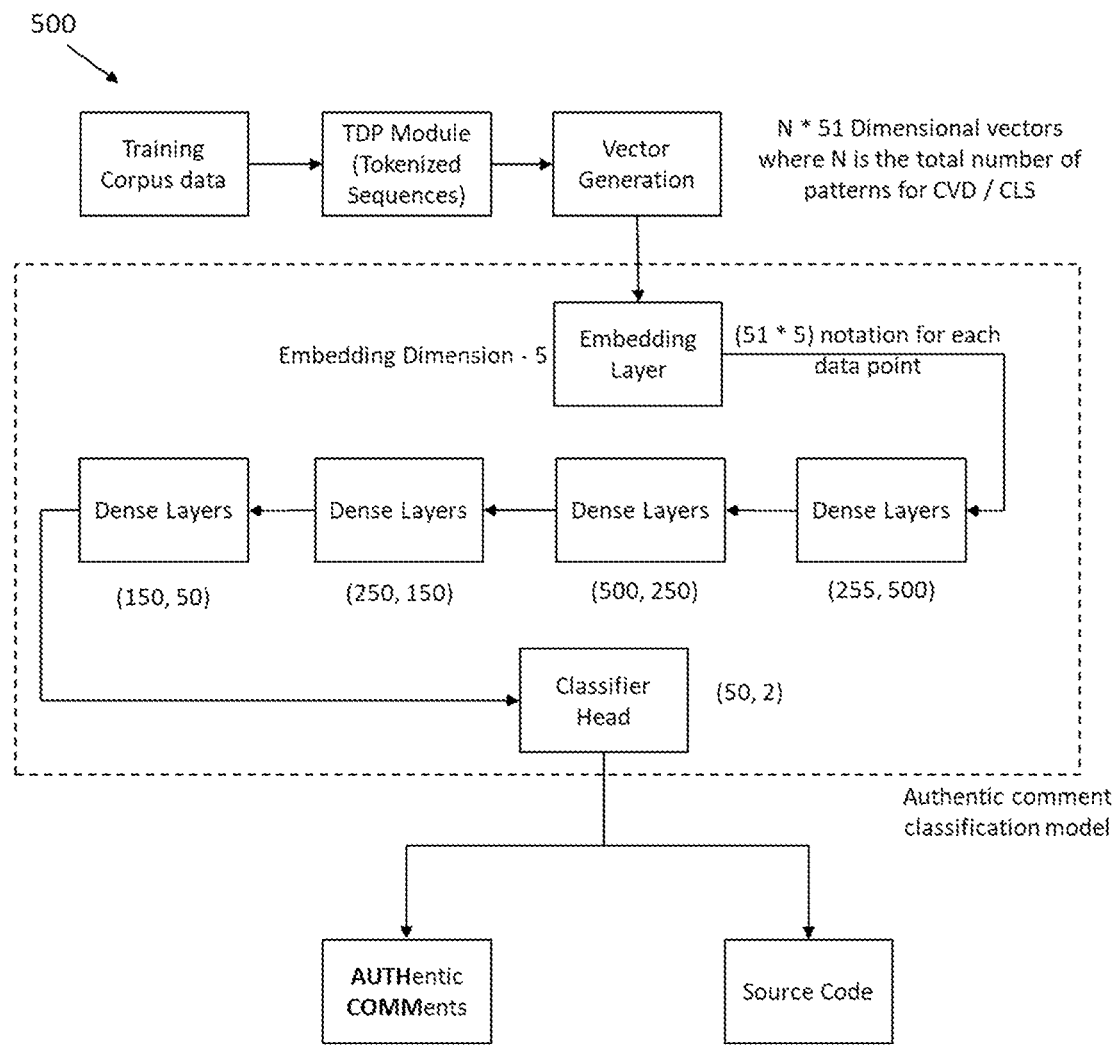
FIG. 5 shows a block diagram explaining the authentic comment classification model according to an embodiment of the present disclosure.

According to an embodiment of the present disclosure, the output generated from flowchart 400 of FIG. 4 is further given as input to train the authentic comment classification model as shown in the block diagram of FIG. 5. The syntactical token sequences extracted from the training corpus data in the training data preparation step, alongside non-syntactical token sequences which is generated by the training data preparation step are given as input to train the model. In the next step, vectors are generated using the syntactical token sequences and the non-syntactical token sequences. The vectors are provided to the authentic comment classification model. The vectors are passed to an embedding layer followed by more than one dense layers. In the present example 4 dense layers have been chosen. It should be appreciated that less or more than four dense layers can also be used by a person skilled in the art. And finally, provided to the classifier head. The output is the classified set of authentic comments from the code comments. The authentic comment classification model utilizes a specific sequence length and a network structure. The sequence length and network structure are chosen as mentioned below:

Sequence Length: Based on the transformed input, the syntactical and non-syntactical token sequences will be of varied lengths. Having the length size to be mapped to the largest sequence length ended up in most of the token sequence only having very sparse information and hence degraded the overall training process. Based on multiple lengths tried out, in an example, the token sequence length of 51 proved to be optimal and had the least loss of information. It should be appreciated that the length of the sequence may be changed by a person skilled in the art depending on the requirements.

Network Structure: In an example, the embedding dimension was fixed as 5 to have a 51*5 notation for each data point. This 51*5 notation for each data point was transformed and learnt in multiple hidden dense layers of the neural network. The output classifier head finally gave out the 2 outputs which determined whether the input data point is an authentic comment or a source code that is commented out.

According to an embodiment of the disclosure, two separate authentic comment neural network classification models are generated from the training corpus data, one is for CVD and one is for CLS.

Figure 2:
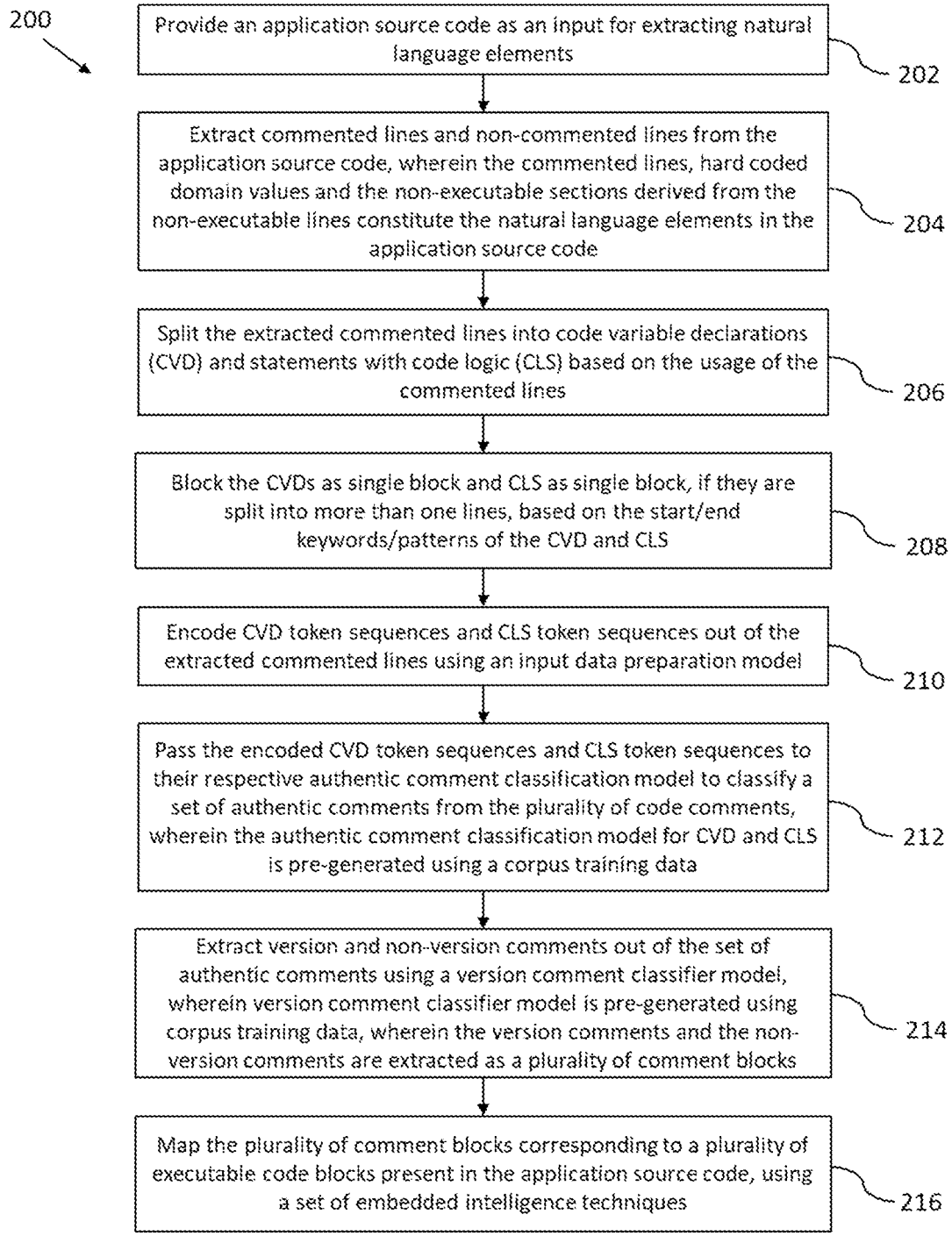
FIG. 2 illustrates a flowchart of a method for extracting natural language elements from an application source code according to some embodiments of the present disclosure.

In operation, a flowchart 200 for extracting natural language elements from the application source code is shown in FIG. 2. Initially at step 202, the application source code is provided as an input for extracting natural language elements via the user interface.

Further at step 204, commented lines and non-commented lines are extracted from the application source code, wherein the commented lines, hard-coded domain values and the non-executable sections derived from the non-executable lines constitute the natural language elements in the application source code.

At step 206 of the flowchart 200, the extracted commented lines are split into code variable declarations (CVD) and statements with code logic (CLS) based on the usage of the commented lines.

At step 208, the CVDs and the CLS are grouped as blocks, if they are split into more than one lines, based on the start-end keywords or patterns of the CVD and CLS as explained above.

Figure 6:
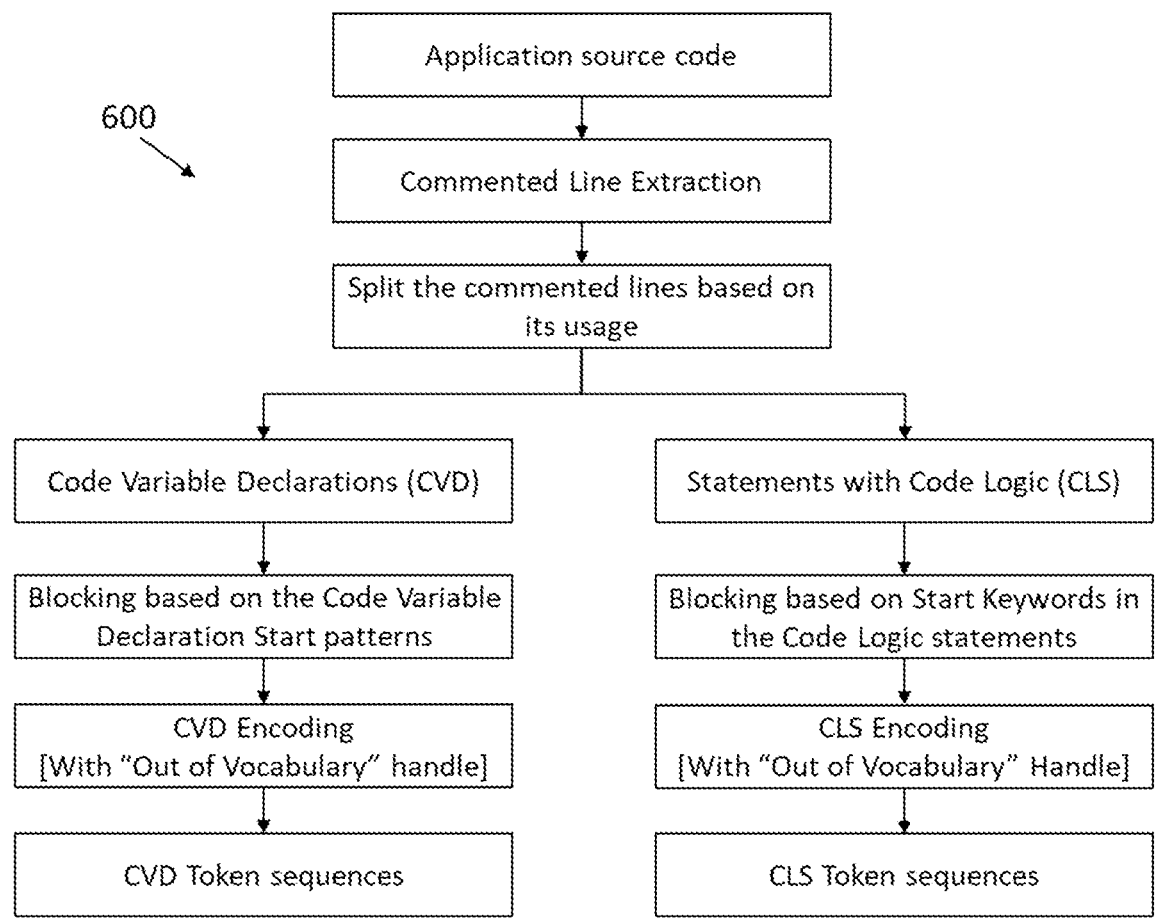
FIG. 6 illustrates a flowchart showing a method for generating token sequences out of the application source code according to some embodiment of the present disclosure.

At step 210 of flowchart 200, CVD token sequences and CLS token sequences are encoded out of the extracted commented lines using an input data preparation model. A flowchart 600 showing a method for generating token sequences from the application source code is shown in FIG. 6. The input data for the authentic comment classification model is generated using the input data preparation (IDP) module. The flowchart 600 follows the same process as the steps used for generating the token sequences from the training corpus data.

The input data preparation for the application source code also does the similar steps like the training data preparation for the training corpus data. The main difference in the fact that training data is trained with executable lines of code only once for the model creation but input data will execute for each input on the non-executable commented lines of code.

Initially, comment lines are extracted from the application source code. These lines are then split into code variable declarations (CVD) and statements with code logic (CLS) based on its usage. Further, for CVD data, grouping is done based on the code variable declaration start patterns, followed by CVD encoding with out of vocabulary handle. Similarly for CLS data, blocking/grouping is done based on start keywords in the code logic statements, followed by CLS encoding with out of vocabulary handle. This step results in the generation of CVD token sequences and CLS token sequences.

Figure 7:
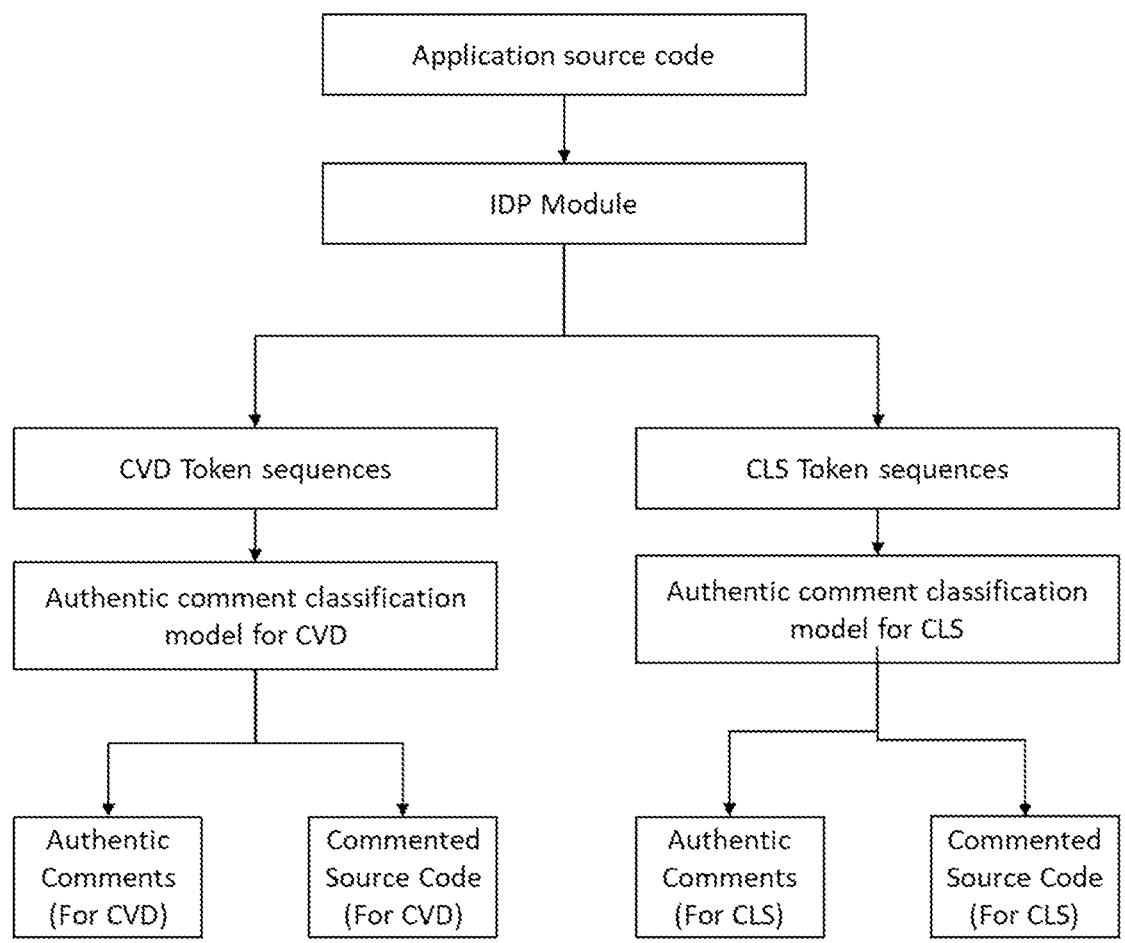
FIG. 7 illustrates a block diagram explaining the execution of the trained authentic comment classification model on the application source code according to some embodiment of the present disclosure.

At step 212 of flowchart 200, the encoded CVD token sequences and CLS token sequences are passed to their respective authentic comment classification model to classify a set of authentic comments from the code comments, wherein the authentic comment classification model for CVD and CLS is pre-generated using a corpus training data as explained above. FIG. 7 is a block diagram explaining the execution of the trained authentic comment classification model on the application source code. Thus, the output of this step is the authentic comments for CVD, source code which is commented in CVD, authentic comments for CLS, source code which is commented in CLS.

According to an embodiment of the disclosure, the system 100 also comprises the version comment classification model. The authentic comments are further trained and fed into the version comment classification model. The version comment classification model is configured to classify the authentic comments into version comments and non-version comments. The output of the authentic comment classification model is preprocessed with a training data preparation module 114 for version classifier (TDP-VC).

Figure 8:
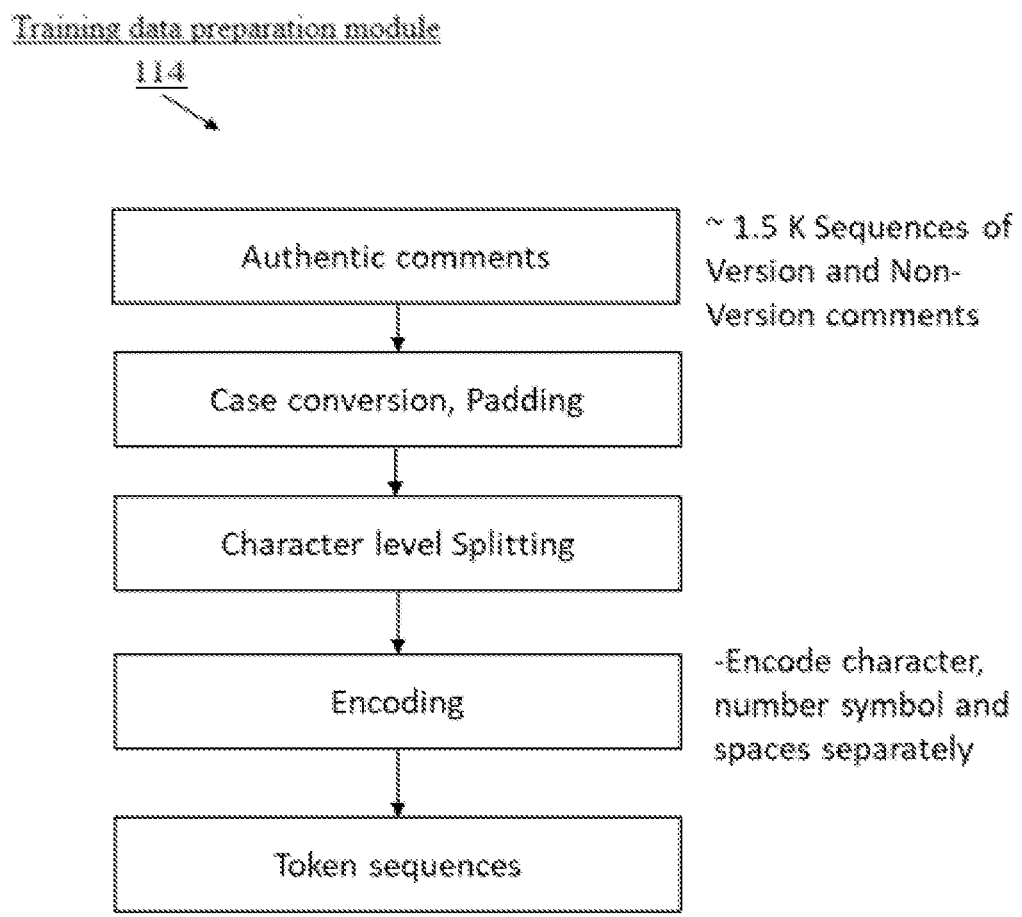
FIG. 8 illustrates a flowchart showing the preparation of training data to be used by a version comment classification model according to some embodiment of the present disclosure.

The block diagram of the training data preparation module 114 for version (TDP-VC) is shown in FIG. 8, where the given data point is encoded in character level. The training data preparation step for the version comment classification is also a one-time activity which will take in the authentic comment as input. Case conversion, padding and character level encoding is done to ensure that the structure of a version comment is learnt and given as input. The token sequences from the encoding output is provided to the training model.

The Input data preparation for the version comment classification will be similar to the training data preparation step and will undergo the same steps to provide the token sequences. In an example, encoding token sequences are restricted to a length of 65 which had the optimal information about each data point. It should be appreciated any other token sequence length can also be used by a person skilled in the art.

Figure 9:
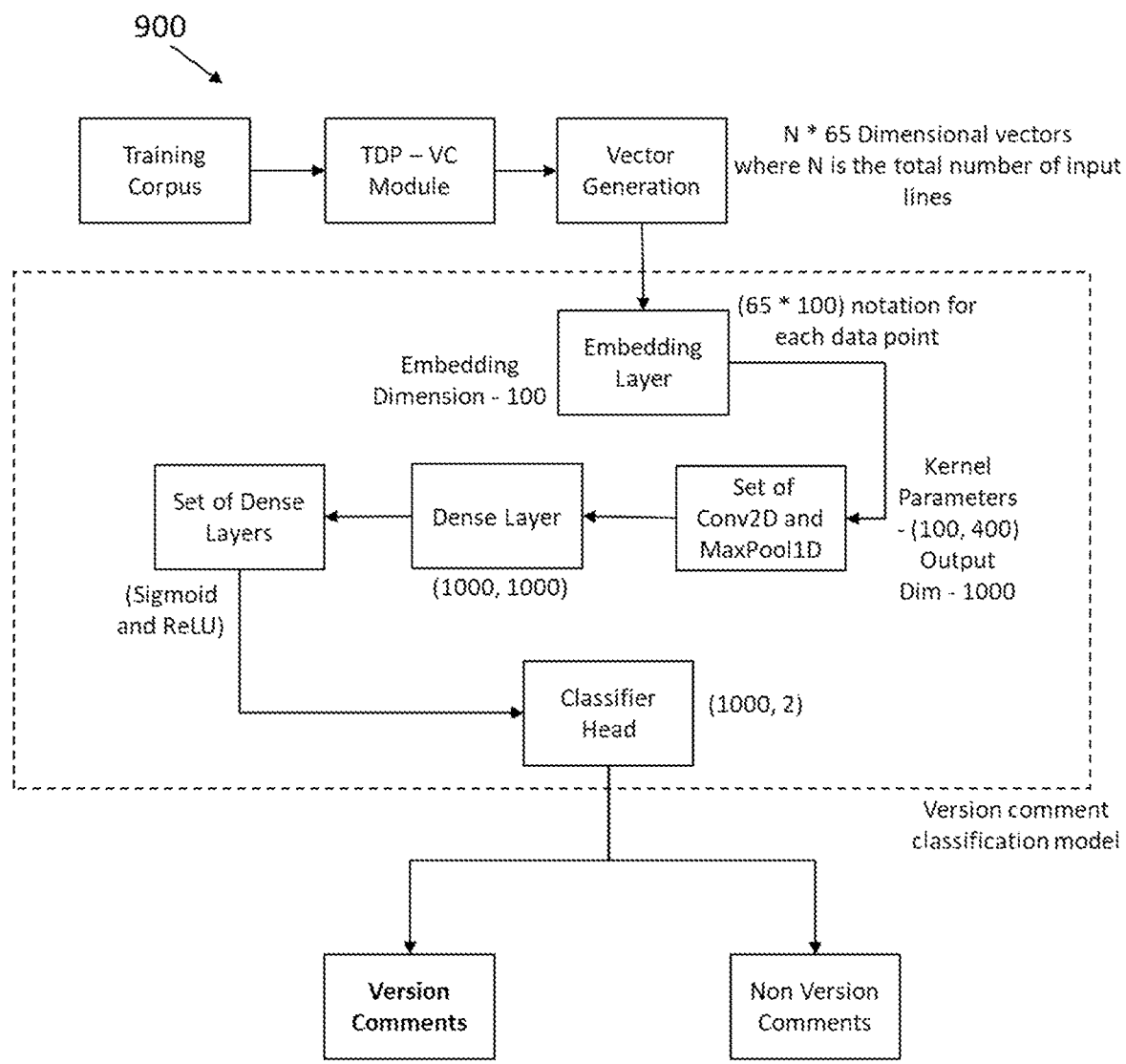
FIG. 9 illustrates a block diagram explaining a version comment classification model according to some embodiment of the present disclosure.
Figure 10:
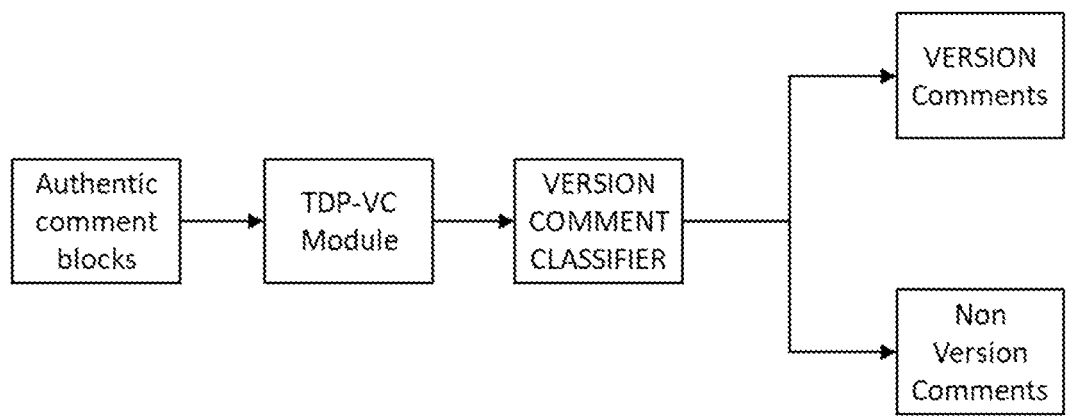
FIG. 10 illustrates a block diagram explaining the execution of the version comment classification model according to some embodiment of the present disclosure.

FIG. 9 illustrates a flowchart 900 explaining a version comment classification model training according to some embodiment of the present disclosure. The authentic comments are further trained and fed into the version comment classification model to be differentiated as version comments and non-version comments. In an example, the encoding token sequences are restricted to a length of 65 which had the optimal information about each data point. The version comment classification model is using a convolutional neural network structure followed by a set of dense layers.

In an example of the present disclosure, the network structure has the embedding dimension of 100 enabled 65*100 notation for each data point. This was further fed into a convolutional layers of varied kernel parameters (100, 200, 300, 400). All the outputs are further aggregated together to an output dimension of 1000. It should be appreciated that any other numerical values can also be used by a person skilled in the art in the network structure depending on the requirements.

The dense layers are arranged in such a way that they are more efficient feature extractor than a normal feed forward layer. After aggregating convoluted output from different kernel sized convolution layers it's important to bring them into a unified space. The output of these dense Layers are superior feature contributing to each class during the process of classification.

Further at step 214 of the flowchart 200, version and non-version comments are extracted out of the set of authentic comments using the generated version comment classification model, wherein the version comment classifier model is pre-generated using corpus training data as explained above, wherein the version comments and the non-version comments are extracted as a plurality of comment blocks. The execution of the version comment classification model with the application source code is shown in block diagram of FIG. 10.

Figure 11:
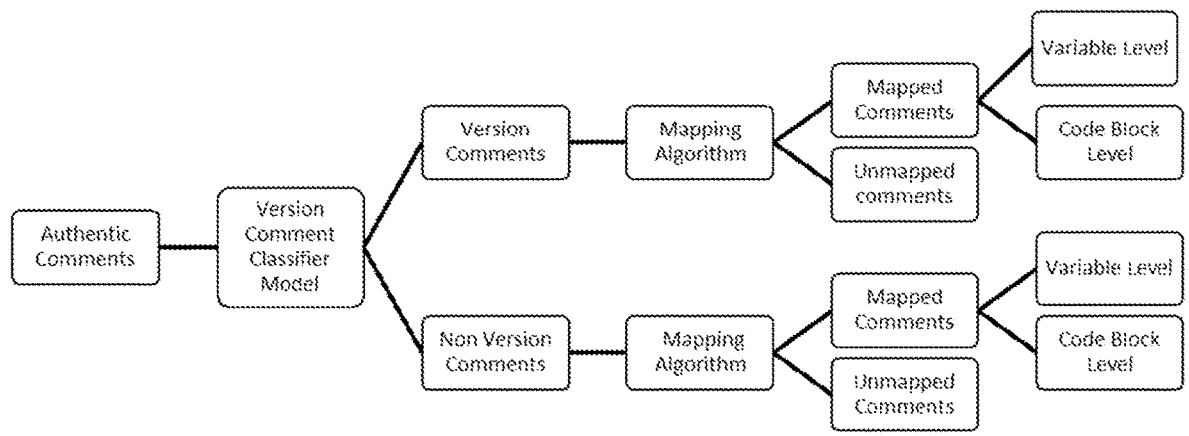
FIG. 11 illustrates a block diagram explaining the mapping process of the extracted comments according to some embodiment of the present disclosure.

Finally, at step 216 of the flowchart 200, the plurality of comment blocks are mapped corresponding to a plurality of executable code blocks present in the application source code, using a set of embedded intelligence techniques. FIG. 11 illustrates a block diagram explaining the mapping process of the extracted comments according to some embodiment of the present disclosure. Once the authentic comments are identified, this is assigned and mapped to various elements within the program to establish an understanding about those elements. This learning can be used in conjunction with the code analysis techniques to have more meaningful contextualization then for those code analysis techniques. The extracted information from the application source code which includes hard-coded domain values, authentic comments and version comments enrich the overall contextual documentation of the system 100.

Figure 12:
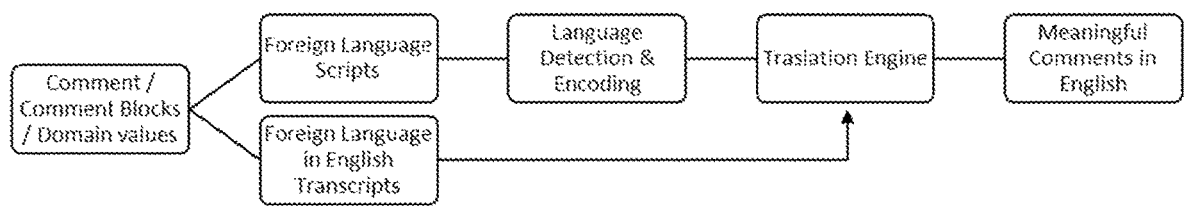
FIG. 12 is a block diagram showing integration of the system with a translation engine according to some embodiment of the present disclosure.

FIG. 12 is a block diagram showing integration of the system 100 with a translation engine according to some embodiment of the present disclosure. The comments of the code/domain values/message literals can be written in different languages also. Thus, comments or comment blocks or domain values can be in foreign language script, are provided as input. These go through the language detection and encoding. After encoding, these comments are provided to the translation engine. And finally meaningful comments in English are provided as the output.

According to an embodiment of the disclosure, the output of system 100 can be utilized in various analytics and Insights. There are multiple analytics and insights that can be extracted from the code comments and the other natural language elements within the code. The system explained above combines the comments with the corresponding elements and makes them consumable in all the associated analysis which can be performed on them.

In an example, the system 100 can be used in automated code annotation. The information available from the multiple natural language elements in the code is filtered, classified and mapped to the corresponding source code elements (interface level, program level, block level, statement level etc. . . . ). This will help in the automated annotation of these code elements based on the available documentation.

In another example, the system 100 can also be used in business glossary enrichment. The data elements that provide a unique meaning which corresponds to the business are known as business terms. Analyzing the comments, domain values and the hard-coded values with in the code can help in augmenting the context of each business term and where it is used. This in turn augments the existing business glossary.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of extracting meaningful information out of the natural language elements present in application source codes. The embodiment thus provides the method and system for extracting natural language elements and also infer meaningful insights from them for a given an application source code.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for extracting natural language elements from an application source code, the method comprising:
   providing, via one or more hardware interfaces, the application source code as an input for extracting natural language elements, wherein the application source code comprises executable lines and non-executable lines;
   extracting, via the one or more hardware interfaces, commented lines and non-commented lines from the application source code, wherein the commented lines, one or more hard-coded domain values and one or more non-executable sections derived from the non-executable lines constitute the natural language elements in the application source code;
   splitting, via the one or more hardware interfaces, the extracted commented lines into code variable declarations (CVDs) and statements with code logic (CLS) based on usage of the commented lines;
   grouping, via the one or more hardware interfaces, the CVDs and CLS as blocks, if they are split into more than one line, based on start-end keywords or patterns of the CVD and CLS, wherein for CVD data, grouping is done based on the code variable declaration patterns followed by CVD encoding with out of vocabulary handle, and wherein for CLS data grouping is done based on start keywords in code logic statements followed by CLS encoding with out of vocabulary handle;
   using, via the one or more hardware interfaces, deep learning networks to understand one or more patterns of the CVD and CLS present in the application source code and segregating a set of authentic comments from the application source code which is commented during at least one of a codefix and an enhancement;
   logically grouping, via the one or more hardware interfaces, discrete commented lines of code into a plurality of comment blocks;
   encoding, via the one or more hardware interfaces, CVD token sequences and CLS token sequences out of the blocks of CVD and CLS using an input data preparation model;
   passing, via the one or more hardware interfaces, the encoded CVD token sequences and CLS token sequences to an authentic comment classification model to classify the set of authentic comments from a plurality of code comments, wherein the authentic comment classification model for CVD and CLS is pre-generated using a corpus training data, wherein the corpus training data for the authentic comment classification model is generated by generating at least one of syntactical token sequences and non-syntactical token sequences, wherein the corpus training data is prepared by removing executable lines of code only once for corpus training data creation and data is prepared for inclusion in the corpus training data by extracting non-executable commented lines of code and wherein the syntactical token sequences and the non-syntactical token sequences are provided as inputs to train the authentic comment classification model, and wherein the executable lines of code contain a combination of multiple syntactical patterns, the multiple syntactical patterns being at least one of CVDs and initiations of CVDs and a set of syntactical patterns which is a combination of code logic statements (CLS);
   generating one or more vectors using the syntactical token sequences and the non-syntactical token sequences, the vectors being provided to the authentic comment classification model and wherein the vectors are passed to an embedding layer followed by more than one dense layer and utilizing a specific sequence length and a network structure by the authentic comment classification model, and generating two separate authentic comment neural network classification models for CVDs and CLS;
   extracting, via the one or more hardware interfaces, version and non-version comments out of the set of authentic comments using a version comment classifier model, wherein the version comment classifier model is pre-generated using the corpus training data, wherein the version comments and the non-version comments are extracted as the plurality of comment blocks and wherein the set of authentic comments are further used for training and are fed into the version comment classification model to be differentiated as at least one of version comments and non-version comments; and
   mapping the plurality of comment blocks corresponding to a plurality of executable code blocks present in the application source code, via the one or more hardware interfaces, using a set of embedded intelligence techniques.

2. The method of claim 1 further comprising getting a meaning out of non-English comments in the application source code using a translation engine.

3. The method of claim 1 further comprising preparing the corpus training data for the authentic comment classification model by:
   providing the corpus training data as an input for extracting the natural language elements, wherein the corpus training data comprises the executable lines and the non-executable lines;
   extracting the non-commented executable lines from the training corpus data;
   splitting the extracted non-commented executable lines into the code variable declarations (CVD) and the statements with code logic (CLS) based on usage of the non-commented executable lines;
   grouping, the CVD and CLS blocks, if they are split into more than one line, based on start-end keywords or patterns of the CVD and CLS; and
   encoding CVD token sequences and CLS token sequences using a training data preparation model, wherein the encoded CVD tokens and CLS tokens comprise syntactical token sequences used as the corpus training data for the authentic comment classification model.

4. The method of claim 1 further comprising preparing a training data for the version comment classification model by:
  providing the authentic comments classified from the training corpus data as input;
  performing case conversion and padding on the authentic comments;
  performing character level splitting of converted and padded authentic comments; and
  encoding one or more split comments to get token sequences to be used as training data for the version comment classification model.

5. The method of claim 1 wherein the plurality of comment blocks comprises one or more of source code comments, nonvalue adding comments, authentic comments with logic, and authentic comments with no logic.

6. The method of claim 1 further comprising a grouping algorithm to handle a code line continuation.

7. A system for extracting natural language elements from an application source code, the system comprises:
  one or more hardware processors;
  a memory in communication with the one or more hardware processors, wherein the one or more hardware processors are configured to execute programmed instructions stored in the one or more first memories, to:
    provide the application source code as an input for extracting natural language elements, wherein the application source code comprises executable lines and non-executable lines;
    extract commented lines and non-commented lines from the application source code, wherein the commented lines, one or more hard-coded domain values and one or more non-executable sections derived from the non-executable lines constitute the natural language elements in the application source code;
    split the extracted commented lines into code variable declarations (CVDs) and statements with code logic (CLS) based on usage of the commented lines;
    group the CVD and CLS as blocks, if they are split into more than one line, based on start-end keywords or patterns of the CVD and CLS, wherein for CVD data, grouping is done based on the code variable declaration patterns followed by CVD encoding with out of vocabulary handle, and wherein for CLS data grouping is done based on start keywords in code logic statements followed by CLS encoding with out of vocabulary handle;
    use deep learning networks to understand one or more patterns of the CVD and CLS present in the application source code and segregate a set of authentic comments from the application source code which is commented during at least one of a codefix and an enhancement;
    logically group discrete commented lines of code into a plurality of comment blocks;
    encode CVD token sequences and CLS token sequences out of the block of CVD and CLS using an input data preparation model;
    pass the encoded CVD token sequences and CLS token sequences to an authentic comment classification model to classify a set of authentic comments from a plurality of code comments, wherein the authentic comment classification model for CVD and CLS is pre-generated using a corpus training data, wherein the corpus training data for the authentic comment classification model is generated by generating at least one of syntactical token sequences and non-syntactical token sequences, wherein the corpus training data is prepared by removing executable lines of code only once for corpus training data creation and data is prepared for inclusion in the corpus training data by extracting non-executable commented lines of code and wherein the syntactical token sequences and the non-syntactical token sequences are provided as inputs to train the authentic comment classification model, and wherein the executable lines of code contain a combination of multiple syntactical patterns, the multiple syntactical patterns being at least one of CVDs and initiations of CVDs and a set of syntactical patterns which is a combination of code logic statements (CLS);
    generate one or more vectors using the syntactical token sequences and the non-syntactical token sequences, the vectors being provided to the authentic comment classification model and wherein the vectors are passed to an embedding layer followed by more than one dense layer and utilizing a specific sequence length and a network structure by the authentic comment classification model, and generating two separate authentic comment neural network classification models for CVDs and CLS;
    extract version and non-version comments out of the set of authentic comments using a version comment classifier model, wherein the version comment classifier model is pre-generated using the corpus training data, wherein the version comments and the non-version comments are extracted as the plurality of comment blocks and wherein the set of authentic comments are further used for training and are fed into the version comment classification model to be differentiated as at least one of version comments and non-version comments; and
    map the plurality of comment blocks corresponding to a plurality of executable code blocks present in the application source code, using a set of embedded intelligence techniques.

8. The system of claim 7 further comprising a translation engine for getting a meaning out of non-English comments in the application source code.

9. The system of claim 7 further configured to prepare the corpus training data for the authentic comment classification model, via the one or more hardware interfaces, by:
  providing the corpus training data as an input for extracting natural language elements, wherein the corpus training data comprises the executable lines and the non-executable lines;
  extracting the non-commented executable lines from the corpus training data;
  splitting the extracted non-commented executable lines into the code variable declarations (CVD) and the statements with code logic (CLS) based on usage of the non-commented executable lines;
  grouping, the CVD and CLS blocks, if they are split into more than one line, based on start-end keywords or patterns of the CVD and CLS; and
  encoding CVD token sequences and CLS token sequences using a training data preparation model, wherein the encoded CVD tokens and CLS tokens comprise the syntactical token sequences used as the corpus training data for the authentic comment classification model.

10. The system of claim 7 wherein the plurality of comment blocks comprises one or more of source code comments, nonvalue adding comments, authentic comments with logic, and authentic comments with no logic.

11. One or more non-transitory machine readable information storage mediums comprising one or more instructions which when executed by one or more hardware processors cause the instructions to manage plurality of events, the instructions cause:
- providing the application source code as an input for extracting natural language elements, wherein the application source code comprises executable lines and non-executable lines;
- extracting commented lines and non-commented lines from the application source code, wherein the commented lines, one or more hard-coded domain values and one or more non-executable sections derived from the non-executable lines constitute the natural language elements in the application source code;
- splitting the extracted commented lines into code variable declarations (CVDs) and statements with code logic (CLS) based on usage of the commented lines;
- grouping the CVDs and CLS as blocks, if they are split into more than one line, based on start-end keywords or patterns of the CVD and CLS, wherein for CVD data, grouping is done based on the code variable declaration patterns followed by CVD encoding with out of vocabulary handle, and wherein for CLS data grouping is done based on start keywords in code logic statements followed by CLS encoding with out of vocabulary handle;
- using, deep learning networks to understand one or more patterns of the CVD and CLS present in the application source code and segregating a set of authentic comments from the application source code which is commented during at least one of a codefix and an enhancement;
- logically grouping discrete commented lines of code into a plurality of comment blocks;
- encoding CVD token sequences and CLS token sequences out of the blocks of CVD and CLS using an input data preparation model;
- passing the encoded CVD token sequences and CLS token sequences to a respective authentic comment classification model to classify a set of authentic comments from a plurality of code comments, wherein the authentic comment classification model for CVD and CLS is pre-generated using a corpus training data, wherein the corpus training data for the authentic comment classification model is generated by generating at least one of syntactical token sequences and non-syntactical token sequences, wherein the corpus training data is prepared by removing executable lines of code only once for corpus training data creation and data is prepared for inclusion in the corpus training data by extracting non-executable commented lines of code and wherein the syntactical token sequences and the non-syntactical token sequences are provided as inputs to train the authentic comment classification model, and wherein the executable lines of code contain a combination of multiple syntactical patterns, the multiple syntactical patterns being at least one of CVDs and initiations of CVDs and a set of syntactical patterns which is a combination of code logic statements (CLS);
- generating one or more vectors using the syntactical token sequences and the non-syntactical token sequences, the vectors being provided to the authentic comment classification model and wherein the vectors are passed to an embedding layer followed by more than one dense layer and utilizing a specific sequence length and a network structure by the authentic comment classification model, and generating two separate authentic comment neural network classification models for CVDs and CLS;
- extracting version and non-version comments out of the set of authentic comments using a version comment classifier model, wherein the version comment classifier model is pre-generated using the corpus training data, wherein the version comments and the non-version comments are extracted as the plurality of comment blocks and wherein the set of authentic comments are further used for training and are fed into the version comment classification model to be differentiated as at least one of version comments and non-version comments; and
- mapping the plurality of comment blocks corresponding to a plurality of executable code blocks present in the application source code, using a set of embedded intelligence techniques.

* * * * *